United States Patent
Matos et al.

(10) Patent No.: US 9,853,480 B2
(45) Date of Patent: Dec. 26, 2017

(54) APPARATUS, SYSTEMS AND METHODS FOR WIRELESS CHARGING FOR PC PLATFORMS AND PERIPHERALS

(75) Inventors: Gary N. Matos, Portland, OR (US); Ronald W. Gallahan, Portland, OR (US); James J. Walsh, Santa Clara, CA (US); Songnan Yang, San Jose, CA (US); Emily B. Cooper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 13/992,766

(22) PCT Filed: Dec. 8, 2011

(86) PCT No.: PCT/US2011/063879
§ 371 (c)(1),
(2), (4) Date: Jul. 2, 2014

(87) PCT Pub. No.: WO2012/177283
PCT Pub. Date: Dec. 27, 2012

(65) Prior Publication Data
US 2015/0002086 A1    Jan. 1, 2015

Related U.S. Application Data

(60) Provisional application No. 61/499,600, filed on Jun. 21, 2011.

(51) Int. Cl.
*H02J 7/00* (2006.01)
*H02J 7/02* (2016.01)
(Continued)

(52) U.S. Cl.
CPC ............. *H02J 7/025* (2013.01); *G06F 1/266* (2013.01); *H02J 7/007* (2013.01); *H02J 7/0052* (2013.01);
(Continued)

(58) Field of Classification Search
CPC ... G06F 1/266; H02J 2007/0001; H02J 5/005; H02J 7/0052; H02J 7/007; H02J 7/025
See application file for complete search history.

(56) References Cited

U.S. PATENT DOCUMENTS 7,791,311 B2    9/2010    Sagoo
2004/0150934 A1    8/2004    Baarman
(Continued)

FOREIGN PATENT DOCUMENTS

EP    2 056 426 A2    5/2009
JP    H09103037    4/1997
(Continued)

OTHER PUBLICATIONS

Office Action Received for Japanese Patent Application No. 2014-516963, dated Nov. 18, 2014, 5 pages of Office Action and 5 pages of English Translation.
(Continued)

*Primary Examiner* — Vuthe Siek
(74) *Attorney, Agent, or Firm* — Patent Capital Group (57) ABSTRACT

Disclosed is a wireless charging device for charging electronic devices placed within proximity of the transmitter of the wireless charging device. The wireless charging device includes an inductive coupler, a reflected power detector, a power source and a power control system. The inductive coupler is configured to charge at least one electronic device present in the charging area. The inductive coupler takes power form the power source. The inductive coupler is also capable of communicating with electronic devices being
(Continued)

charged to exchange a set of information. In addition to notebook PCs, this solution can be extended to desktop and tablet PCs, slates and office furniture as pervasive means of wireless charging multiple devices.

19 Claims, 8 Drawing Sheets

(51) Int. Cl.
*G06F 1/26* (2006.01)
*H02J 5/00* (2016.01)
(52) U.S. Cl.
CPC ....... *H02J 5/005* (2013.01); *H02J 2007/0001* (2013.01)

(56) References Cited

U.S. PATENT DOCUMENTS

| | | | |
|---|---|---|---|
| 2009/0001929 A1* | 1/2009 | Posamentier | H02J 7/025 320/108 |
| 2009/0048003 A1 | 2/2009 | Lu et al. | |
| 2010/0038970 A1* | 2/2010 | Cook | H02J 5/005 307/104 |
| 2011/0032070 A1 | 2/2011 | Bleile | |
| 2011/0241614 A1 | 10/2011 | Yeh | |
| 2013/0175875 A1* | 7/2013 | Kurs | B60L 11/182 307/104 |

FOREIGN PATENT DOCUMENTS

| | | |
|---|---|---|
| JP | 2008148520 | 6/2008 |
| JP | 2009251895 | 10/2009 |
| JP | 2010268610 | 11/2010 |
| JP | 2011067072 | 3/2011 |
| JP | 3168006 | 4/2011 |
| JP | 2011120432 | 6/2011 |
| KR | 10-2007-0099245 A | 10/2007 |
| WO | 2012/177283 A1 | 12/2012 |

OTHER PUBLICATIONS

International Search Report and Written Opinion received for PCT Application No. PCT/US2011/063879, dated Jun. 13, 2012, 13 pages.
International Preliminary Report on Patentability with Written Opinion received for PCT Patent Application No. PCT/US2011/063879, dated Jan. 9, 2014, 7 Pages.

* cited by examiner

APPARATUS, SYSTEMS AND METHODS FOR WIRELESS CHARGING FOR PC PLATFORMS AND PERIPHERALS

CROSS-REFERENCES TO RELATED APPLICATIONS

This application claims priority to U.S. Provisional Application No. 61/499,600, entitled "APPARATUS, SYSTEMS AND METHODS FOR WIRELESS CHARGING FOR PC PLATFORMS AND PERIPHERALS," filed Jun. 21, 2011, the entire disclosure of which is incorporated herein by reference in its entirety.

BACKGROUND

1. Field of the Disclosed Embodiments

The disclosure relates to wireless charging for Personal Computer (PC) platforms and peripherals.

2. Introduction

There is a significant and continually increasing need for widely available power, particularly in the field of consumer and business electronics, due to the proliferation of laptop computers, cell phones, music players, personal digital assistants and other self-powered rechargeable portable/remote devices that require periodic charging. In many public places, power may not be readily available to the general public because of the need for a power outlet for a wired connection.

Energy or power may be transferred wirelessly using a variety of known radiative, or far-field, and non-radiative, or near-field, techniques. For example, radiative wireless information transfer using low-directionality antennas, such as those used in radio and cellular communications systems and home computer networks, may be considered wireless energy transfer. However, this type of radiative transfer is very inefficient because only a tiny portion of the supplied or radiated power, namely, that portion in the direction of and overlapping with, the receiver is picked up. The vast majority of the power is radiated away in all the other directions and lost in free space.

The need to power PC platforms and peripherals, such as Smartphones, is ever present. Portability is also very important in today's computing environment. Thus, the ability to charge PC platforms and peripherals without cabled device chargers is very important with no existing apparatus, methods or systems to adequately accomplish this.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DISCLOSED EMBODIMENTS

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed embodiments may concern Personal Computer (PC) platforms and peripherals. Terminology that may be used in the present disclosure may include:

IWCS: Intel® Wireless Charging solution;

BEON: An Intel® derived usage term where the receiver must reside on top of an associated transmitter to obtain power;

BEBY: An Intel® derived usage term where the receiver may be in close proximity to (not touching) an associated transmitter to obtain power;

QTC: Quarter Torpid Coil design;

FTC: Flat Trace Coil design (also referred to as planar coils).

The term "wireless energy" is used herein to mean any form of energy associated with electric fields, magnetic fields, electromagnetic fields, or otherwise that is transmitted between a transmitter to a receiver without the use of physical electrical conductors.

Although embodiments of the invention are not limited in this regard, discussions utilizing terms such as, for example, "processing," "computing," "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

Embodiments of the present invention may provide a method, comprising: wirelessly charging a peripheral device from by a charging source in close proximity to the peripheral device using a wireless resonance energy link. In an embodiment of the present invention the charging source may be a notebook computer and the peripheral device may be a Smartphone.

Further embodiments of the present invention may provide an apparatus, comprising a charging source adapted to charge a peripheral device using a wireless resonance energy link when the charging source is in close proximity to the peripheral device.

The wireless charging solution of embodiments of the present invention allows an end-user to wirelessly charge their smart phone and other devices directly from their notebook PC. This unique capability is based on Wireless Resonance Energy Link (WREL) technology. In addition to notebook PCs, this solution can be extended to desktop and tablet PCs, slates and office furniture as pervasive means of wireless charging multiple devices. The primary advantages of the implementation herein include:

Charging Source: Notebook 'is' the source users can leave device chargers at home;

Positional Flexibility: Allows the device to be within proximity of the notebook transmitter;

Charging Power: Provides convenient power for smartphones, pico-projectors and more; and Intelligent Software: Allows control of battery charging and provides real-time feedback.

Figure 1:
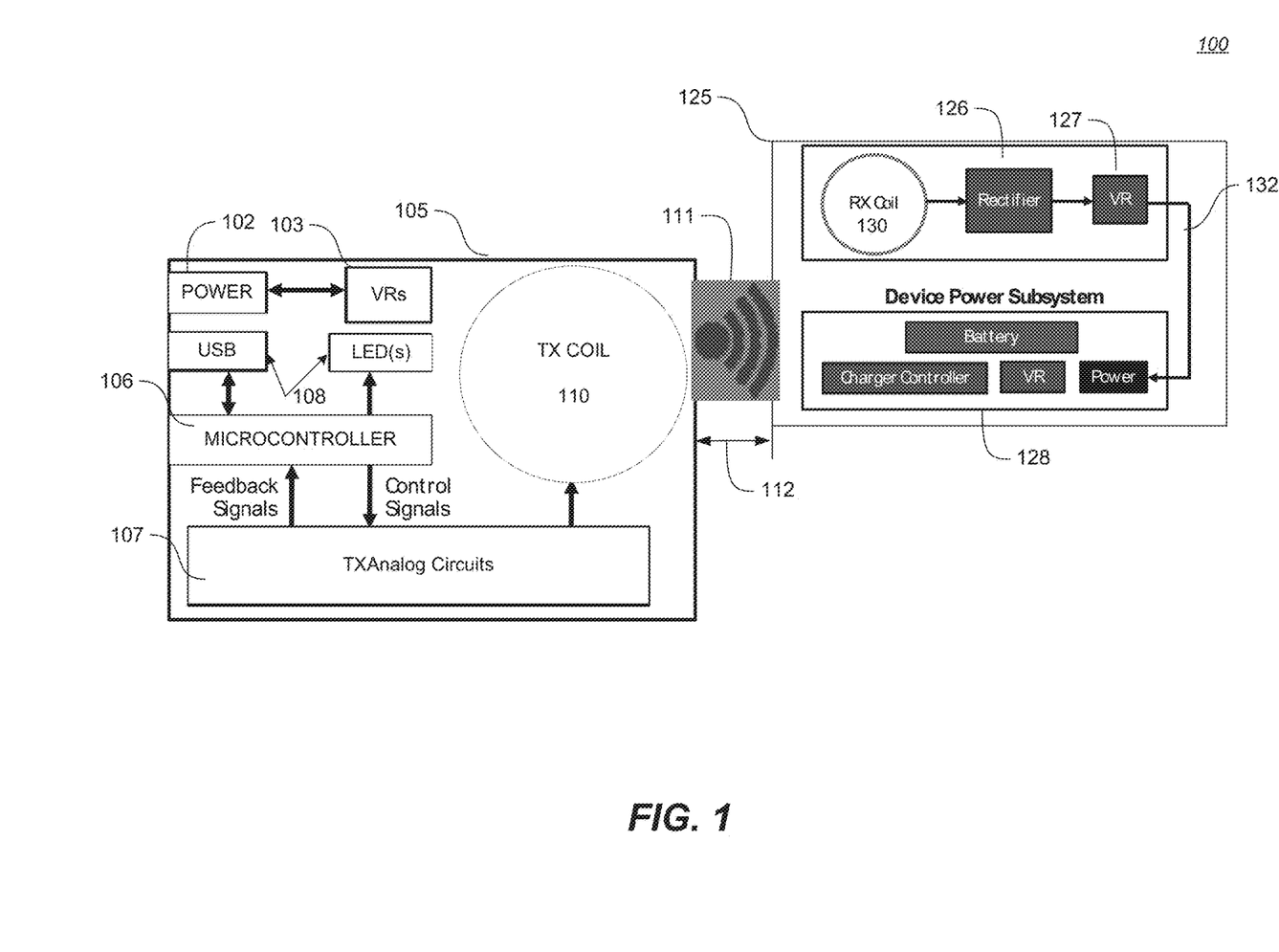
FIG. 1 shows a simplified block diagram of a wireless power transfer system in accordance to an embodiment.

FIG. 1 shows a simplified block diagram of a wireless power transfer system 100 in accordance to an embodiment. FIG. 1 illustrates wireless transmission or charging system, in accordance with various exemplary embodiments of the present invention. Input power 102 is provided to a transmitter 110 for generating a radiated field 111 for providing energy transfer. A receiver 130 couples to the radiated field 111 and generates an output power 132 for storing or consumption by a device (not shown) coupled to the output power 110. Transmitter 110 is housed in a wireless charging device 105 such as a notebook PC, but can be extended to desktop and tablet PCs, slates and office furniture as pervasive means of wireless charging multiple devices. It should be noted that wireless charging device 105 can be a device that can receive and source wireless power (BE-ALL). Additionally, the wireless charging device 105 may comprise one or more voltage regulator 103, controller or microcontroller 106 to control wireless power policies, TXAnalog Circuits 107 such as power amplifiers, impedance matching, power sensing, and other circuits known to those in the art.

Receiver 130 is housed in an electronic device 125 such as a smartphone, Bluetooth device, battery pack, or other devices that can be charged wirelessly. The output power 132 could be processed through a rectifier 126 and voltage regulator 127 before being sent to the target device power subsystem. Both the transmitter 110 and the receiver 130 are separated by a distance 112. In one exemplary embodiment, transmitter 110 and receiver 108 are configured according to a mutual resonant relationship. Transmitter 110 further includes a transmit antenna (not shown) for providing a vehicle for energy transmission and receiver 130 further includes a receive antenna (not shown) for providing a means for energy reception. The transmit and receive antennas are sized according to applications and devices to be associated therewith. Selection and management of the transmitter allows the charging system 100 to operate either in BEON or BEBY configurations and to operate at 13.56 MHz or 6.78 MHz.

Figure 2:
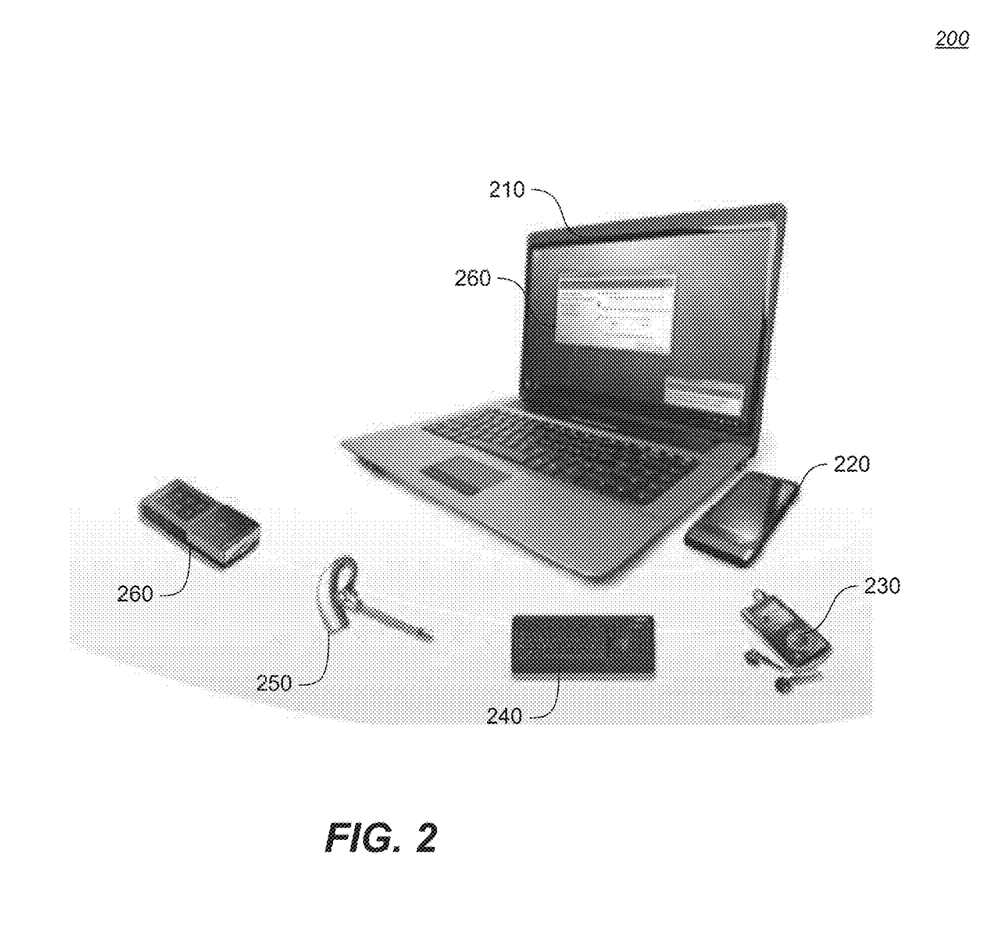
FIG. 2 illustrates peripherals and notebook PC as a wireless charging solution in accordance to an embodiment.

FIG. 2 illustrates peripherals and notebook PC as a wireless charging solution in accordance to an embodiment. FIG. 2 illustrates a notebook computer 210 with peripherals that may be utilized by embodiments of the present invention. These may include, but are not limited to, mobile phones 220, such as Smartphones, mobile music devices 230, wireless keyboards and mice 240, Bluetooth wireless devices 250, such as hands-free devices 260 and any other mobile information devices. A mobile information device can be a mobile phone, a personal digital assistant (PDA), or any other mobile communication apparatus. The wireless charging device, the notebook PC 210, uses an IWCS User Interface 560 to configure policies that govern the relationship between the transmission of wireless power and other platform performance and power characteristics. At any time, the user of the wireless charging device such as the notebook PC 210 may configure the IWCS software to deliver more or less power to the IWCS subsystem.

The ICWS software exchanges a set of information with the chargeable electronic device such as Bluetooth wireless devices 250. The set of information is used during the charging of the electronic device. The set of information includes, but is not limited to, the presence of at least one electronic device within the proximity of the wireless charging device or within generating a radiated field 111, charging requirement of the at least one electronic device, a charging state of the wireless charging device such as notebook PC 210, and safety information corresponding to the charging of the at least one electronic device. The communication link between the inductive coupler and the electronic device may be a bidirectional link. The communication link can function as long as some amount of power is being supplied from the inductive coupler to the electronic device. In an embodiment of the present disclosure, the set of information can be exchanged in a closed loop communication with the electronic device. The closed loop communication allows the electronic device to constantly tune its output power characteristics such as its power requirement and its presence in the proximity of wireless charging area (radiated field 111) of the wireless charging device during the charging operation.

Figure 3:
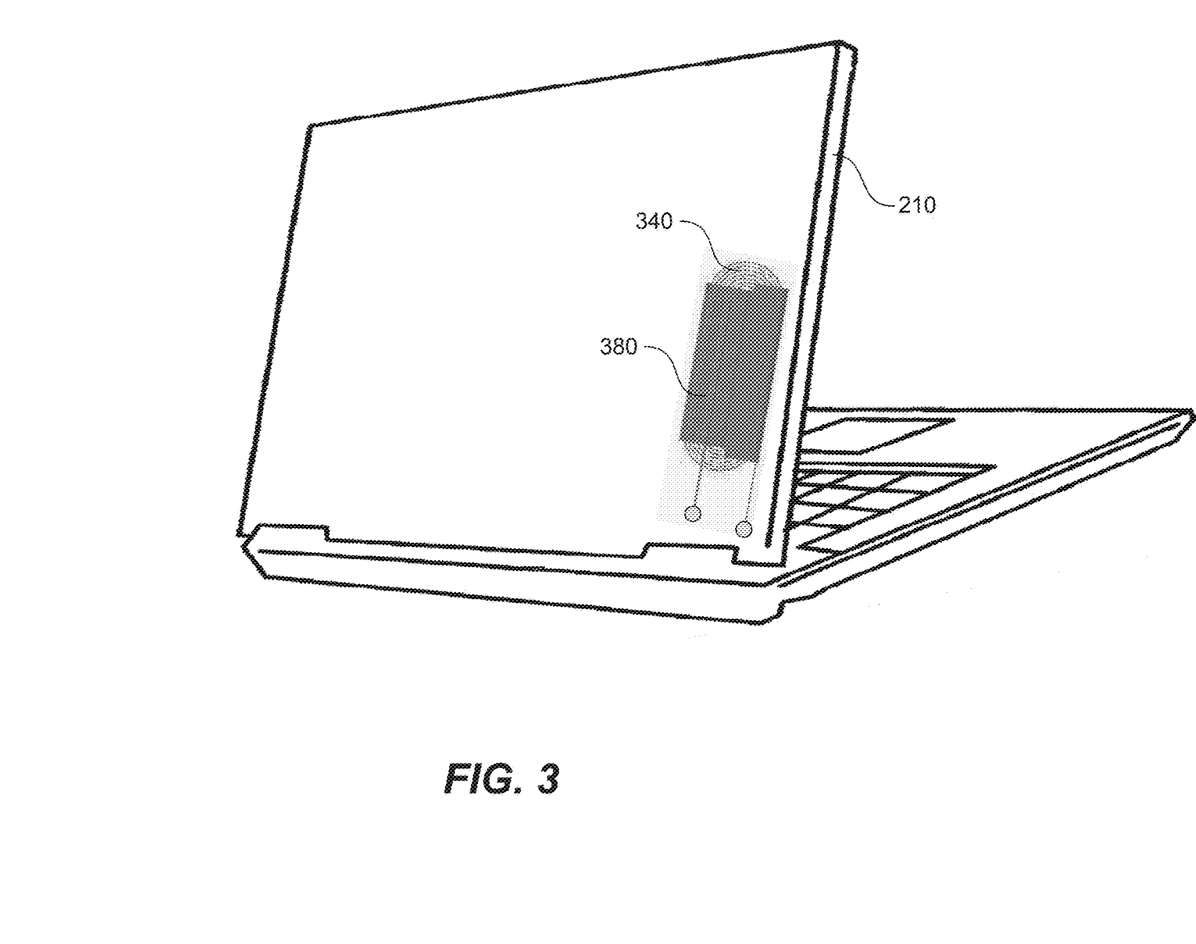
FIG. 3 illustrates a notebook PC having a transmit antenna and a receive antenna coupled thereto in accordance to an embodiment.

FIG. 3 illustrates a notebook PC having a transmit antenna and a receive antenna coupled thereto in accordance to an embodiment. The illustrated wireless charging device is a notebook PC 210 which may comprise a transmit antenna 340 and associated transmitter circuitry (not shown) configured tier transmitting wireless power and an optional receive antenna 380 and associated receiver circuitry (not shown) configured for receiving wireless power. It is noted that each antenna, the receive antenna 380 and the transmit antenna 340, may be coupled to notebook PC 210 in a manner so as to avoid any electrical interference between the antennas and any metallic components of notebook PC 210.

Figure 4:
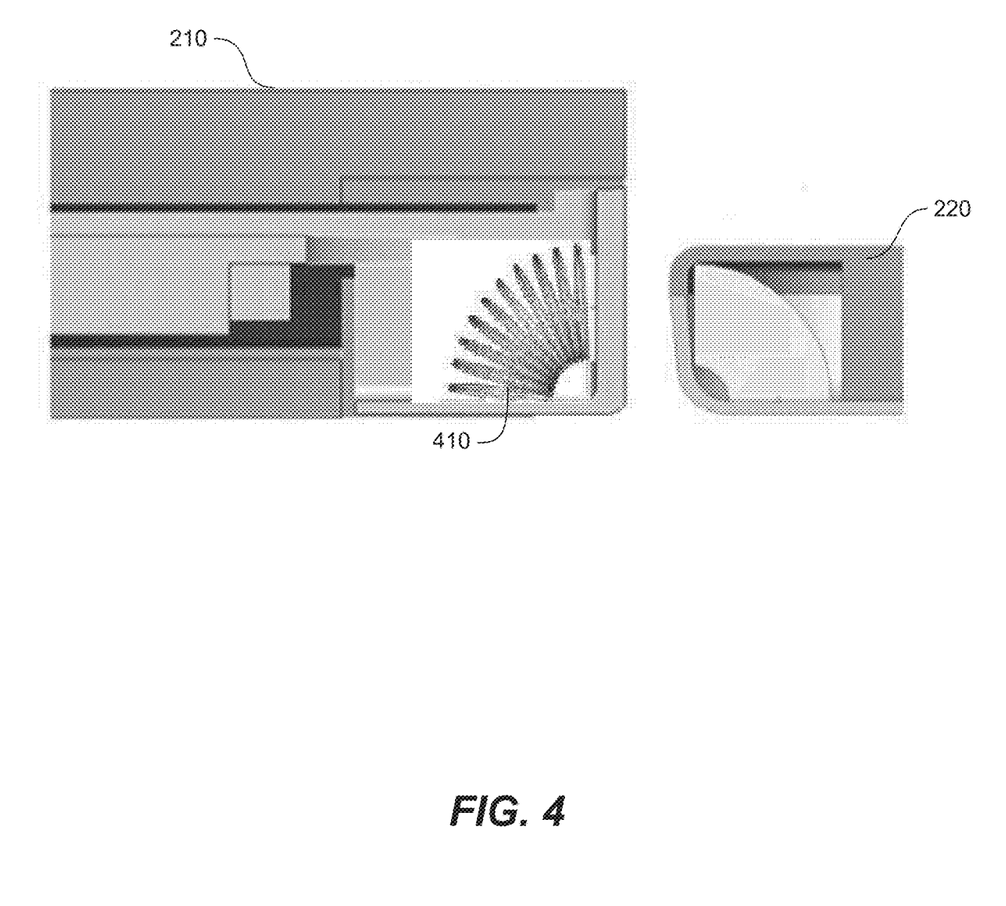
FIG. 4 illustrates a smart phone cross-section and a notebook PC cross-section with QTC design for wireless charging in accordance to an embodiment.

FIG. 4 illustrates a smart phone cross-section and a notebook PC cross-section with QTC design for wireless charging in accordance to an embodiment. The illustration provides a notebook PC 210 cross-section, QTC configuration 410 and Smartphone cross-section 220. The Notebook PC Cross-section shows 10 mm coils and the Smart-phone cross section illustrates an 8 mm coil, for example.

Figure 5:
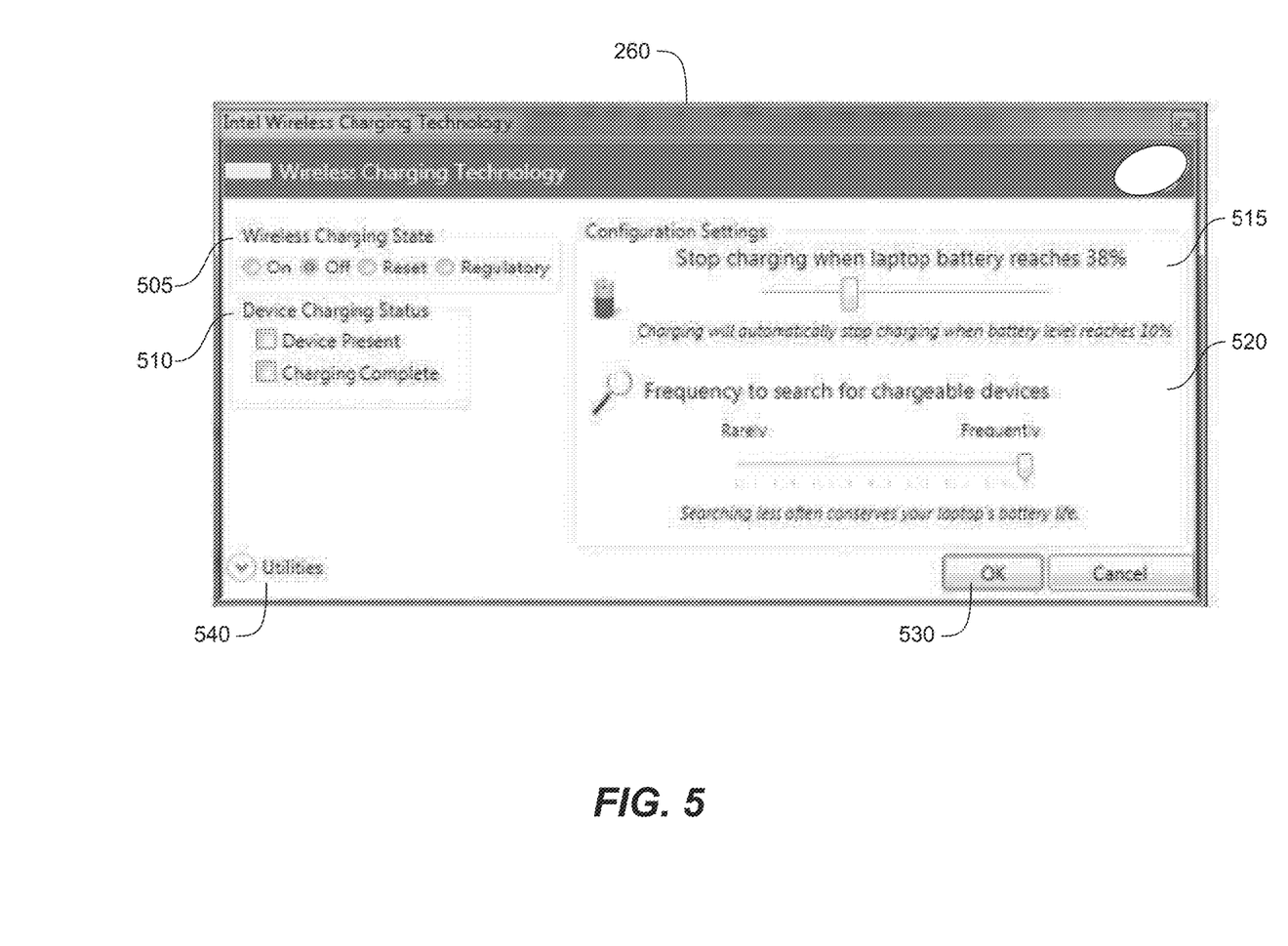
FIG. 5 is an interface to an intelligence software to provide wireless charging in accordance to an embodiment.
Figure 6:
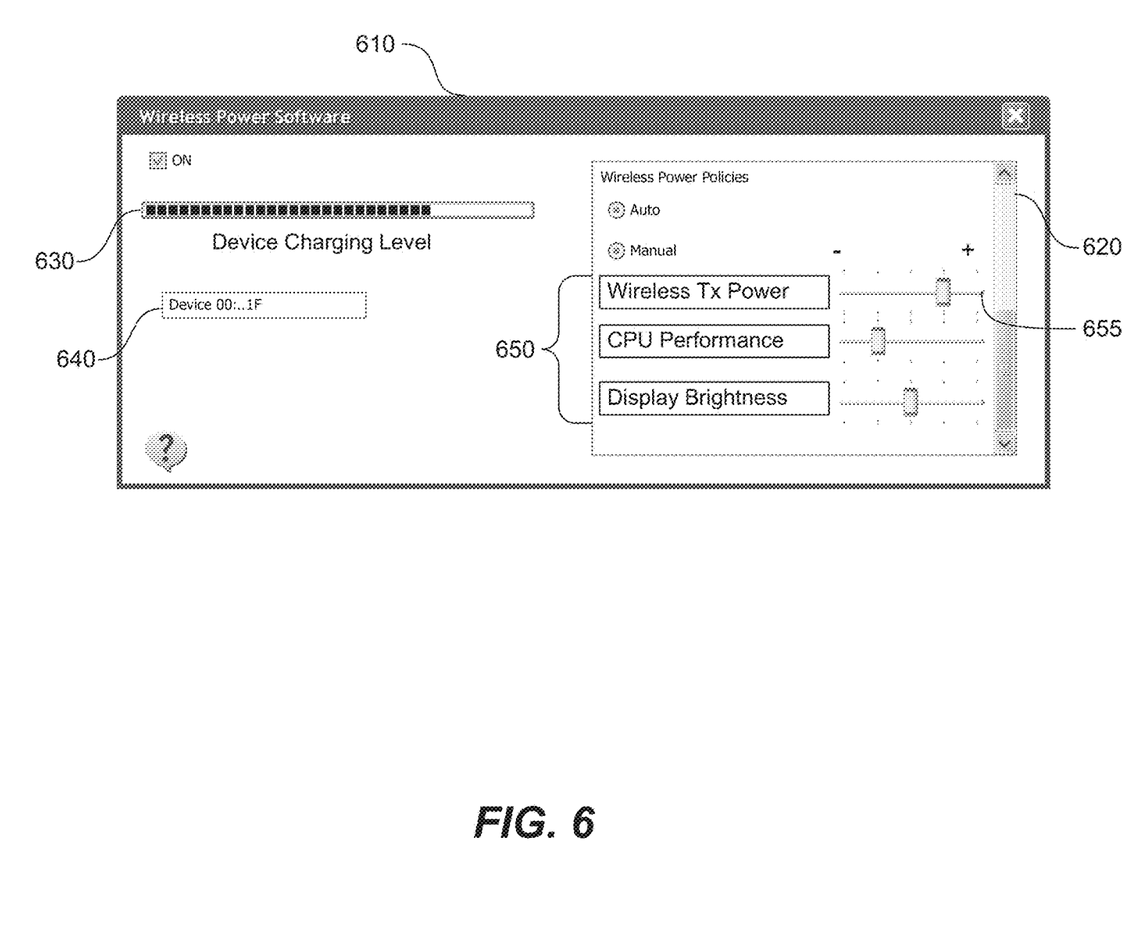
FIG. 6 is an interface to configure wireless power policies for a source device in accordance to an embodiment.

FIG. 5 is an interface to intelligence software to provide wireless charging in accordance to an embodiment. FIG. 5 illustrates an IWCS User Interface 560. This may include, but is not limited to, configuration settings 515, frequency to search for chargeable devices 520, wireless charging state 505 such as "ON", "OFF", "RESET", "Regulatory", device charging status 510 such as "Device Present" and "Charging Complete", just to name a few. The user may select and save different wireless charging solution settings 530 ("OK") prior to beginning the transfer of power. The IWCS user interface 260 also further offers a mean 540 ("utilities") to invoke another user interface as shown in FIG. 6 that may be displayed on a display of notebook PC 210, for example. The wireless power software (WPS) user interface 610 includes one or more configuration policies that may be selected and set by the user.

FIG. 6 is an interface to configure wireless power policies for a source device in accordance to an embodiment. FIG. 6 illustrates the wireless power software (WPS) user interface 610. The WPSUI 610 may be invoked and displayed when a user selects utilities function 540, the user may choose to set policies 620 that meter other aspects of system performance 650, in deference to maximizing wireless power transmission. Examples of system performance characteristics 650 that could be metered by the end user include CPU processing power, power delivered to Optical Disk Drives (ODDs), screen display brightness, CPU performance, device charging level 630, device identification 640, and others. Alternately, the software could support an automatic mode where the user simply selects the wireless power transmission level 655 and the software intelligently meters other platform performance aspects consistent with the user selection. A metering application collect metrics data elements such as CPU usage or other notebook PC 210 usage, the data may record the resulting metrics data to a data log at a memory. The data log may be a file or multiple files residing on the network PC or on a remote location, should be noted that both UI 560 and UI 610 could be combined into a single user interface to set the wireless charging policies, setting, and meter subsystem to provide a Wireless Charging solution.

Figure 7:
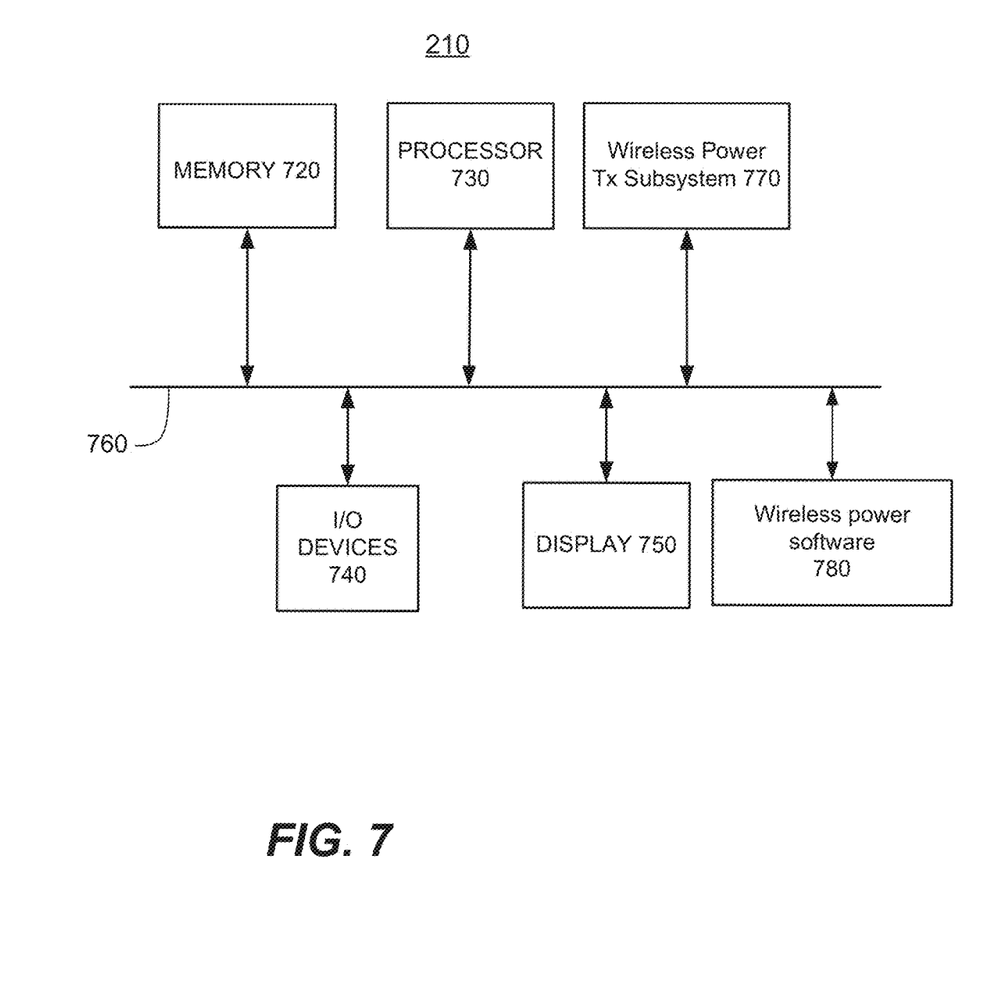
FIG. 7 illustrates a block diagram of a system for controlling a wireless power source in accordance to an embodiment.

FIG. 7 illustrates a block diagram of a system for controlling a wireless power source in accordance to an embodiment. FIG. 7 illustrates a diagram of a wireless charging device such as notebook PC 210. The wireless charging device may be embodied within devices such as a desktop computer, a laptop computer, a handheld computer, a handheld communication device, or another type of computing device, or the like. The wireless charging device may include a memory 720, a processor 730, input/output devices 740, a display 750 and a bus 760. The bus 760 may permit communication and transfer of signals among the components of the wireless charging device such as notebook PC 210.

Processor 730 may include at least one conventional processor or microprocessor that interprets and executes instructions. The processor 730 may be a general purpose processor or a special purpose integrated circuit, such as an ASIC, and may include more than one processor section. Additionally, the wireless charging device may include a plurality of processors 730.

Memory 720 may be a random access memory (RAM) or another type of dynamic storage device that stores information and instructions for execution by processor 730. Memory 720 may also include a read-only memory (ROM) which may include a conventional ROM device or another type of static storage device that stores static information and instructions for processor 730. The memory 720 may be any memory device that stores data for use by wireless charging device 210.

Input/output devices 740 (I/O devices) may include one or more conventional input mechanisms that permit a user to input information to the wireless charging device 210, such as a microphone, touchpad, keypad, keyboard, mouse, pen, stylus, voice recognition device, buttons, etc., and output mechanisms such as one or more conventional mechanisms that output information to the user, including a display, one or more speakers, a storage medium, such as a memory, magnetic or optical disk, disk drive, a printer device, etc., and/or interfaces for the above. The display 750 may typically be an LCD or CRT display as used on many conventional computing devices, or any other type of display device.

The wireless charging device 210 may perform functions in response to processor 730 by executing sequences of instructions or instruction sets contained in a computer-readable medium, such as, for example, memory 720. Such instructions may be read into memory 720 from another computer-readable medium, such as a storage device, or from a separate device via a communication interface, or may be downloaded from an external source such as the Internet. The wireless charging device 100 may be a stand-alone wireless charging device, such as a personal computer, or may be connected to a network such as an intranet, the Internet, or the like.

The memory 720 may store instructions that may be executed by the processor to perform various functions. For example, the memory may store wireless charging instructions such as IWCS power software 780 to allow the wireless charging device to perform various functions in association with a particular wireless power policy to the wireless charging device. The instructions are typically unique to each specific type of wireless charging device, and the wireless charging device may store a plurality of policies each for a different peripheral.

Wireless power transmitter subsystem 770 is configured to operate under the control of wireless power software 780 as implemented in processor 730 to wirelessly transfer power supplied by power source (not shown) to wireless power receiver associated with portable electronic device described in FIG. 2 via an inductive link. The wireless power transfer may be carried out over inductive link in accordance with the well-known principles of inductive coupling or resonant inductive coupling as discussed in the Background Section above. The manner in which wireless power transmitter and wireless power receiver are implemented will depend on the type of inductive coupling used. A variety of transmitter and receiver designs based on inductive coupling and resonant inductive coupling are available in the art and thus need not be described herein.

Wireless power transmitter subsystem 770 comprises in some aspects, Tx Coil and/or Rx Coil arranged as substantially flat, planar or a combination of both. In addition to improving integration with smaller and more planar-sized structure such as a laptop, a flat coil structure can also reduce unwanted spurious radio frequency (RF) emissions, because the substantially flat coil will have a smaller dipole moment in the direction perpendicular to the flat coil. In some aspects, flat coils may be fabricated by forming a suitable number of turns of magnet wire, solid core wire, stranded wire, Litz wire, hollow copper tubing (producing better weight to conductivity ratio) on a non-conductive substrate or armature that maintains the appropriate flat geometry. Moreover, other methods of manufacturing a multi-turn 2D coil may be used including etched or otherwise patterned conductors and those manufactured by any methods used in printed circuit board fabrication.

Figure 8:
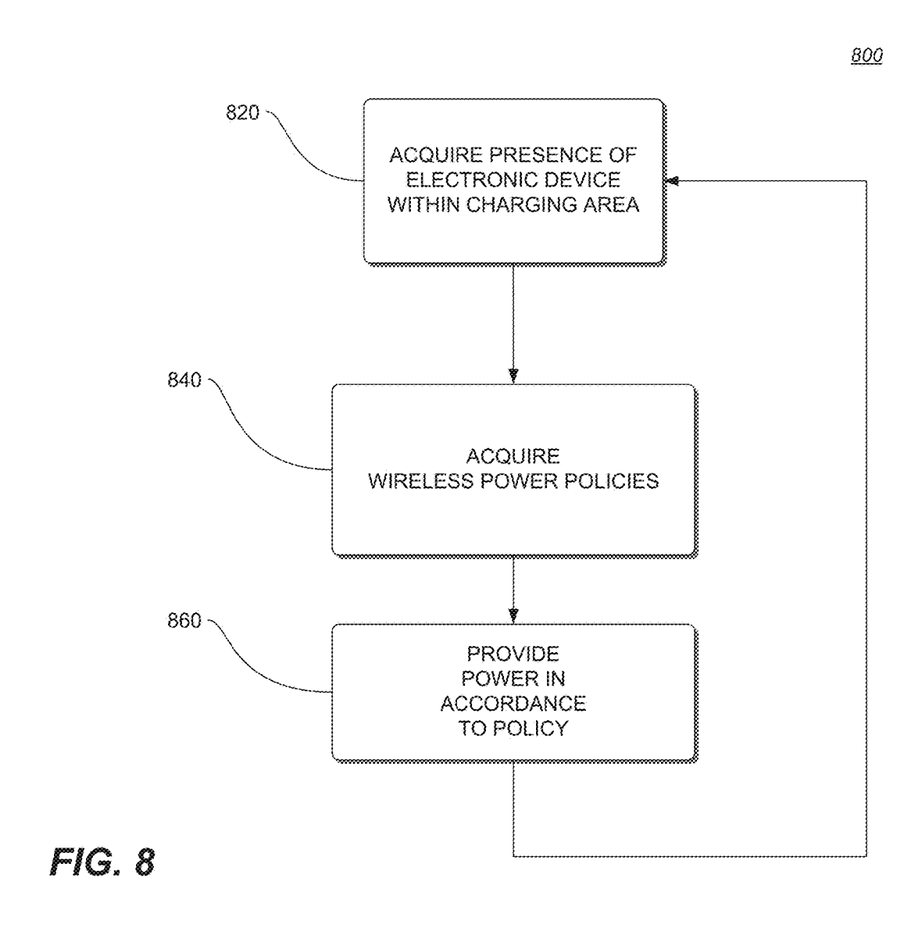
FIG. 8 is a flowchart of a method for wireless charging in accordance to an embodiment.

FIG. 8 is a flowchart of a method for wireless charging in accordance to an embodiment. The method in action 820 performs a function to acquire presence of electronic device within charging area. The method in action 840 performs a function to acquire Wireless Power policies as received from the user through IWCS user interface 560 and wireless power software (WPS) user interface 610. The method in action 840 performs a function to provide Power in Accordance To policy and the requirements for at least one electronic device.

Other unique features of the present disclosure may provide: 1) Can operate either in BEON or BEBY configurations; 2) Can operate at various frequencies, such as 13.56 MHz or 6.78 MHz; 3) FTC or planar coils geometries (like competitive "device on mats') have insufficient efficiency to charge phones in side-by-side configurations; and 4) Low-frequency systems cannot adapt coil geometries to ultra-thin notebooks and phones.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the present invention provide a non-volatile computer readable medium encoded with computer executable instructions, which when accessed, cause a machine to perform operations comprising wirelessly charging a peripheral device from by a charging source in close proximity to the peripheral device using a wireless resonance energy link. Further, embodiments herein may provide the charging source is a notebook computer and the peripheral device is a Smartphone.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A wireless charging system including:
   a power source;
   a voltage regulator coupled to the power source;
   a microcontroller coupled to the voltage regulator and to the power source;
   a transmit analog circuit coupled to the microcontroller;
   a power transmit coil coupled to the transmit analog circuit and controllable by the microcontroller to wirelessly transmit power to an electronic device in close proximity to the system, the coil to wireless transmit power using resonant inductive coupling; and
   a non-volatile computer readable medium encoded with computer executable instructions, which when accessed, cause the wireless charging system to perform operations comprising:
   causing a user interface to be displayed to a user;
   processing an input from the user, the input having been received through the user interface and including wireless charging policies selectable by the user on the user interface prior to a wireless power transmission from the system to the electronic device; and
   controlling the wireless power transmission based on the input.

2. The system of claim 1, wherein the input from the user includes a policy regarding stopping the wireless power transmission in response to a determination that a battery level of the system is at a predetermined level.

3. The system of claim 1, wherein the operations further comprise automatically stopping the wireless power transmission in response to a determination that a battery level of the system has reached a predetermined threshold.

4. The system of claim 1, wherein the input from the user includes a policy regarding whether the system is in an on or off charging state.

5. The system of claim 1, wherein the input from the user includes a policy regarding a charging status of the electronic device.

6. The system of claim 5, wherein the charging status includes at least one of whether the electronic device is in close proximity to the system and whether a wireless charging of the electronic device is complete.

7. The system from claim 1, wherein the input from the user includes a policy regarding a frequency for the system to search for electronic devices to be charged.

8. The system of claim 1, wherein the operations further include processing an input from the user to invoke the user interface.

9. The system of claim 1, wherein the input from the user includes policies regarding metering a performance of the system to maximize the wireless power transmission, the policies regarding metering a performance of the system to maximize the wireless power transmission including at least one of a policy regarding CPU processing power, a policy regarding power delivered to Optical Disk Drives, a policy regarding screen display brightness, a policy regarding CPU performance, a policy regarding a charging level of the electronic device and a policy regarding an identification of the electronic device.

10. The system of claim 9, wherein the operations further include storing metrics data elements on a performance of the system.

11. The system of claim 1, further including a display.

12. A method of operating a wireless charging system including:
   using a power source;
   using a voltage regulator coupled to the power source;
   using a microcontroller coupled to the voltage regulator and to the power source;
   using a transmit analog circuit coupled to the microcontroller;
   using a power transmit coil coupled to the transmit analog circuit and controllable by the microcontroller to wirelessly transmit power to an electronic device in close proximity to the system, the coil to wireless transmit power using resonant inductive coupling; and
   causing a user interface to be displayed to a user;
   processing an input from the user, the input having been received through the user interface and including wireless charging policies selectable by the user on the user interface prior to a wireless power transmission from the system to the electronic device; and
   controlling the wireless power transmission based on the input.

13. The method of claim 12, wherein the input from the user includes at least one of a policy regarding stopping the wireless power transmission in response to a determination that a battery level of the system is at a predetermined level, a policy regarding whether the system is in an on or off charging state, a policy regarding a charging status of the electronic device, and a policy regarding a frequency for the system to search for electronic devices to be charged.

14. The method of claim 12, further including automatically stopping the wireless power transmission in response to a determination that a battery level of the system has reached a predetermined threshold.

15. The method of claim 13, wherein the charging status includes at least one of whether the electronic device is in close proximity to the system and whether a wireless charging of the electronic device is complete.

16. The method of claim 12, further including processing an input from the user to invoke the user interface.

17. The method of claim 12, wherein the input from the user includes policies regarding metering a performance of the system to maximize the wireless power transmission, the policies regarding metering a performance of the system to maximize the wireless power transmission including at least one of a policy regarding CPU processing power, a policy regarding power delivered to Optical Disk Drives, a policy regarding screen display brightness, a policy regarding CPU performance, a policy regarding a charging level of the electronic device and a policy regarding an identification of the electronic device.

18. The method of claim 12, further including storing metrics data elements on a performance of the system.

19. The method of claim 12, further including displaying the user interface to the user.

* * * * *

UNITED STATES PATENT AND TRADEMARK OFFICE
CERTIFICATE OF CORRECTION

PATENT NO. : 9,853,480 B2
APPLICATION NO. : 13/992766
DATED : December 26, 2017
INVENTOR(S) : Gary N. Matos et al.

It is certified that error appears in the above-identified patent and that said Letters Patent is hereby corrected as shown below:

In Column 9, Line 8, in Claim 7, delete "from" and insert -- of --, therefor.

Signed and Sealed this
Twenty-ninth Day of May, 2018

Andrei Iancu
*Director of the United States Patent and Trademark Office*